US012490026B2

(12) United States Patent
Brueggenkamp et al.

(10) Patent No.: US 12,490,026 B2

(45) Date of Patent: Dec. 2, 2025

(54) LOUDSPEAKER

(71) Applicants: Tim Brueggenkamp, Ennigerloh (DE); Michele Pontillo, Paderborn (DE); Dirk Olszewski, Paderborn (DE)

(72) Inventors: Tim Brueggenkamp, Ennigerloh (DE); Michele Pontillo, Paderborn (DE); Dirk Olszewski, Paderborn (DE)

(73) Assignee: Paragon GmbH & Co.KGAA, Delbrueck (DE)

( * ) Notice: Subject to any disclaimer, the term of this patent is extended or adjusted under 35 U.S.C. 154(b) by 257 days.

(21) Appl. No.: 18/140,790

(22) Filed: Apr. 28, 2023

(65) Prior Publication Data

US 2023/0353946 A1 Nov. 2, 2023

(30) Foreign Application Priority Data

Apr. 28, 2022 (DE) ......................... 102022110347.1

(51) Int. Cl.

*H04R 9/06* (2006.01)
*H04R 7/12* (2006.01)
*H04R 9/04* (2006.01)

(52) U.S. Cl.

CPC ................. *H04R 9/06* (2013.01); *H04R 7/12* (2013.01); *H04R 9/046* (2013.01); *H04R 2207/00* (2013.01)

(58) Field of Classification Search

CPC . H04R 9/06; H04R 7/12; H04R 9/046; H04R 2207/00

See application file for complete search history.

(56) References Cited

U.S. PATENT DOCUMENTS

2019/0124450 A1* 4/2019 Dodd ........................ H04R 9/06
2022/0248143 A1* 8/2022 Zhou ...................... H04R 1/025

* cited by examiner

*Primary Examiner* — Sunita Joshi

(74) *Attorney, Agent, or Firm* — Andrew Wilford

(57) ABSTRACT

A loudspeaker has a sound-emitting surface or diaphragm and a loudspeaker driver for exciting the sound emitting surface or diaphragm. At least two voice coils of the loudspeaker are operable independently of each other and are constructed and arranged to excite different surface portions of the surface or diaphragm of the loudspeaker.

11 Claims, 1 Drawing Sheet

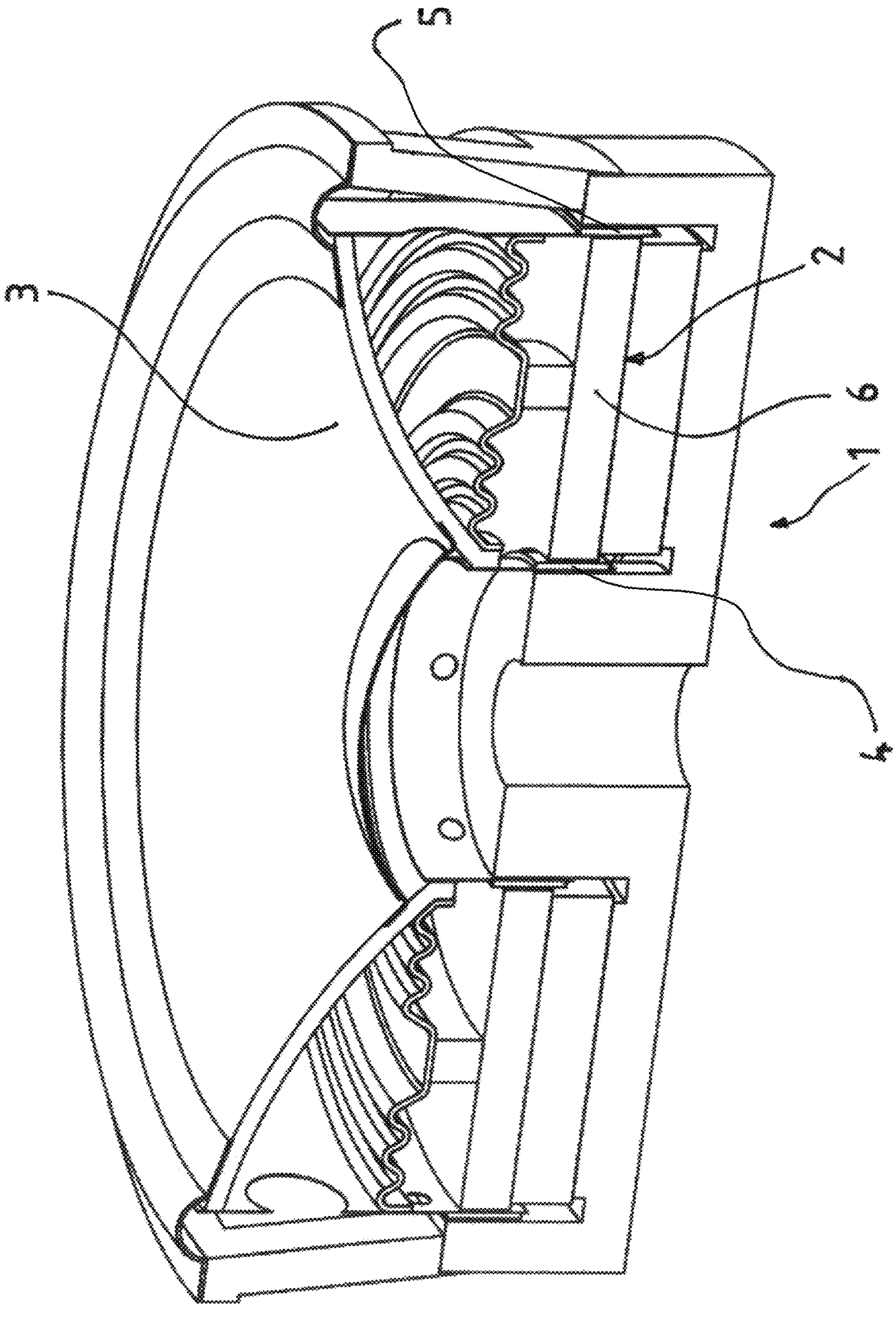
5
2
3
6
1
4

LOUDSPEAKER

FIELD OF THE INVENTION

The present invention relates to a loudspeaker. More particularly this invention concerns a speaker having a driver for exciting a sound-emitting surface or diaphragm of the loudspeaker.

BACKGROUND OF THE INVENTION

In the operation of such a loudspeaker that usually serves to generate sound and can be a cone loudspeaker, for example, the effect occurs, particularly at high frequencies, that a radially inner region of the diaphragm of the loudspeaker oscillates substantially in phase with the voice coil of the loudspeaker driver, whereas a radially outer region of the diaphragm often oscillates in phase opposition or at least out of phase with the voice coil.

Loudspeakers are known from the prior art in which, by the use of particularly stiff yet lightweight materials and a smart-diaphragm geometry, any occurring diaphragm resonances of the loudspeaker driver and the upper limit frequency thereof can be shifted to high frequencies. The diaphragm resonances that occur can be influenced by material damping and diaphragm geometry with regard to their characteristics and distribution. However, the possibilities for influencing the characteristics and distribution of occurring diaphragm resonances in the transmission range of a loudspeaker are limited despite the comparatively high technical and constructive effort.

OBJECTS OF THE INVENTION

It is therefore an object of the present invention to provide an improved speaker.

Another object is the provision of such an improved speaker that overcomes the above-given disadvantages, in particular that has a loudspeaker driver for exciting a sound-emitting surface or diaphragm of the loudspeaker and in which the technical-constructive effort is reduced in comparison with solutions from the prior art and interfering effects due to diaphragm resonances can be reduced to a considerable extent.

SUMMARY OF THE INVENTION

According to the invention, this object is achieved in that the loudspeaker driver has at least two voice coils that are operable independently of each other and that excite different surface portions of the diaphragm of the loudspeaker. By differently selected modes of operation for the different voice coils in which each voice coil is operated on the basis of a suitable signal in each case, movements that are out of phase or that are in phase opposition, in particular such movements of the radially outer region of the diaphragm, can be compensated for with comparatively little effort.

For this purpose, it is advantageous if the loudspeaker driver has an inner voice coil exciting a radially inner surface portion of the diaphragm of the loudspeaker and an outer voice coil exciting a radially outer surface portion of the diaphragm of the loudspeaker.

Advantageously, the outer voice coil and the inner voice coil are concentrically to each other.

In order to further increase the possibilities of influencing the diaphragm vibrations, it is advantageous if at least one further voice coil is provided between the inner voice coil and the outer voice coil, concentrically in the radial direction between the inner voice coil and the outer voice coil.

The diaphragm of the loudspeaker can advantageously be a cone diaphragm.

In particular, it is expedient in the loudspeaker according to the invention if the outer voice coil of the loudspeaker driver is operable in such a way that it excites the radially outer region of the diaphragm of the loudspeaker in such a way that movements of the radially inner region of the diaphragm that are out of phase or that are in phase opposition are compensated for.

Advantageously, in the loudspeaker according to the invention, phase relationships and/or time delays and/or amplitude relationships and/or frequency relationships in the operation of the inner voice coil and the outer voice coil as well as possibly further voice coils can be selected. This opens up a range of variation hitherto unknown in the prior art with regard to the possibilities for exciting the sound-emitting surface or diaphragm of the loudspeaker, which allow diaphragm vibrations that are out of phase or that are in phase opposition to be reduced to an extent corresponding to virtually any requirement profile.

BRIEF DESCRIPTION OF THE DRAWING

The above and other objects, features, and advantages will become more readily apparent from the following description, reference being made of the accompanying drawing whose sole FIGURE is a section through the inventive speaker.

SPECIFIC DESCRIPTION OF THE INVENTION

As seen in the drawing a loudspeaker 1 has a loudspeaker driver 2 that excites a sound-emitting surface or a diaphragm 3 of the loudspeaker 1. Here the loudspeaker driver 2 comprises an inner voice coil 4 and an outer voice coil 5 that are operable by a magnet unit 6 of the loudspeaker 1, the inner voice coil 4 and the outer voice coil 5 being operable independently of each other.

In the embodiment shown, the inner voice coil 4 is concentric with the outer voice coil 5 and the two voice coils 4, 5 are radially next to each other. A radially inner surface portion of the diaphragm 3 of the loudspeaker can be excited by the inner voice coil 4, and a radially outer surface portion of the diaphragm 3 can be excited by the outer voice coil 5.

In principle, it is of course also possible to provide further voice coils radially next to each other between the inner voice coil 4 and the outer voice coil 5 and each of these further voice coils can of course also be operated independently of each other and independently of the inner voice coil 4 and the outer voice coil 5. The inner voice coil 4 and the outer voice coil 5 as well as any further voice coils between them are concentric with each other.

In the embodiment shown in the sole FIGURE, the diaphragm 3 is a cone diaphragm. The radially outer surface portion of this diaphragm or cone diaphragm 3 is excited by the outer voice coil 5 of the loudspeaker driver 2 in such a way that any movements of the outer region of the cone diaphragm 3 that are out of phase or that are in phase opposition, and that may occur during operation of the loudspeaker 1, in particular at high frequencies, are compensated for. For this purpose, the outer voice coil 5 of the loudspeaker driver 2 is operated or controlled accordingly by the magnet unit.

In operation of the inner voice coil 4 and the outer voice coil 5 as well as possibly further voice coils, the phase relationships, the time delays, the amplitude relationships and/or the frequency relationships between the voice coils can be selected. Since, due to the inner voice coil 4 and the outer voice coil 5 at different radial surface portions of the diaphragm or cone diaphragm 3, an independent loading of the radial surface portions of the diaphragm or cone diaphragm 3 assigned to the separate voice coils 4, 5 can be done, and the excitation of diaphragm resonances can be reduced by appropriately selected phase relationships, time delays, amplitude relationships and/or frequency relationships in operation of the inner voice coil 4 and the outer voice coil 5 as well as possibly further voice coils, thereby making possible an operation of the loudspeaker 1 associated with lower interference.

The invention claimed is:

1. A loudspeaker comprising:

a sound-emitting surface or diaphragm;

a loudspeaker driver for exciting the sound emitting surface or diaphragm; and at least two voice coils operable independently of each other but both connected directly to the surface or diaphragm, the voice coils being constructed and arranged to excite respective different surface portions of the surface or diaphragm of the loudspeaker independently of one another.

2. The loudspeaker according to claim 1, wherein the loudspeaker driver has an inner voice coil exciting a radially inner surface portion of the surface or diaphragm of the loudspeaker and an outer voice coil exciting a radially outer surface portion of the surface or diaphragm of the loudspeaker.

3. The loudspeaker according to claim 2, wherein the outer voice coil and the inner voice coil are concentric with each other.

4. The loudspeaker according to claim 2, further comprising:

at least one further voice coil radially concentric with and between the inner voice coil and the outer voice coil.

5. The loudspeaker according to claim 1, wherein the surface or diaphragm is a cone diaphragm.

6. The loudspeaker according to claim 2, wherein the outer voice coil is operable in such a way that it can excite the radially outer region of the surface or diaphragm such that movements of the radially inner region of the surface or diaphragm that are out of phase can be compensated.

7. The loudspeaker according to claim 2, wherein phase relationships in the operation of the inner voice coil and the outer voice coil as well as possibly further voice coils can be selected.

8. The loudspeaker according to claim 2, wherein time delays in the operation of the inner voice coil and the outer voice coil as well as possibly further voice coils can be selected.

9. The loudspeaker according to claim 2, wherein amplitude relationships in the operation of the inner voice coil and the outer voice coil further voice coils can be selected.

10. The loudspeaker according to claim 2, wherein frequency relationships in the operation of the inner voice coil and the outer voice coil as well as possibly further voice coils can be selected.

11. A loudspeaker comprising:

a sound-emitting cone diaphragm;

a loudspeaker driver for exciting the sound emitting cone diaphragm; and inner and outer voice coils connected to the driver, operable independently of each other, and connected directly to respective radially inner and radially outer surface portions of the cone diaphragm, the voice coils being constructed and arranged to excite the respective surface portions of the cone diaphragm of the loudspeaker independently of one another.

* * * * *